United States Patent [19]

Bhatti et al.

[11] 4,342,577
[45] Aug. 3, 1982

[54] METHOD AND APPARATUS FOR FORMING GLASS FIBERS

[75] Inventors: Mohinder S. Bhatti; Alfred Marzocchi, both of Newark, Ohio

[73] Assignee: Owens-Corning Fiberglas Corporation, Toledo, Ohio

[21] Appl. No.: 200,676

[22] Filed: Oct. 27, 1980

[51] Int. Cl.³ ............................................. C03B 37/025
[52] U.S. Cl. ....................................... 65/1; 29/163.5 R; 65/374 RM; 219/121 EM; 428/670; 428/940
[58] Field of Search ...................... 65/1, 2, 374, 12; 29/163.5; 428/670, 940; 219/121 EM

[56] References Cited

U.S. PATENT DOCUMENTS

| 2,555,372 | 6/1951 | Ramage | 204/38 |
| 2,777,254 | 1/1957 | Siefert et al. | |
| 3,132,928 | 5/1964 | Crooks et al. | 29/198 |
| 3,134,659 | 5/1964 | Labino | 65/2 |
| 3,147,547 | 9/1964 | Kuebrich et al. | 29/528 |
| 3,206,846 | 9/1965 | Slayter et al. | 29/470 |
| 3,235,646 | 2/1966 | Sens | 13/6 |
| 3,248,190 | 4/1966 | Woodward et al. | 65/1 |
| 3,371,409 | 3/1968 | Bonnet et al. | 29/528 |
| 3,461,058 | 12/1969 | Westfield et al. | 204/290 |
| 3,480,523 | 11/1969 | Tyrrell | 204/43 |
| 3,511,306 | 5/1970 | Warkoczewski | 65/15 |
| 3,518,066 | 6/1970 | Bronnes et al. | 29/195 |
| 3,657,784 | 4/1972 | Selman et al. | 29/195 |
| 3,736,109 | 5/1973 | Darling et al. | 29/195 |
| 3,741,735 | 6/1973 | Buttle | 29/198 |
| 3,827,953 | 8/1974 | Haldeman | 204/37 R |
| 3,875,028 | 4/1975 | Atlee et al. | 204/37 R |
| 3,947,333 | 3/1976 | Bianchi et al. | 204/129 |
| 3,971,646 | 7/1976 | Rhodes | 65/157 |
| 3,973,920 | 8/1976 | Tadokoro et al. | 29/194 |
| 4,066,864 | 1/1978 | Heitmann | 219/121 EM |
| 4,105,828 | 8/1978 | Borchert et al. | 428/665 |
| 4,140,507 | 2/1979 | Costin et al. | 65/2 |

FOREIGN PATENT DOCUMENTS

| 1033627 | 6/1966 | United Kingdom | 65/1 |
| 1242921 | 8/1971 | United Kingdom | 65/1 |

OTHER PUBLICATIONS

Hot Isostatic Processing, MCIC-77-34, Battele Labs, Columbus, Ohio, Nov. 1977, pp. 1-99.

Primary Examiner—Robert L. Lindsay, Jr.
Attorney, Agent, or Firm—Ronald C. Hudgens; Robert F. Rywalski; Greg Dziegielewski

[57] ABSTRACT

A laminated wall for a feeder for supplying streams of molten glass to be attenuated into filaments is provided comprising: a refractory metal core having an oxygen impervious, precious metal sheath intimately bonded thereto by hot isostatic pressing to form a laminate, said laminate having at least one aperture extending therethrough adapted to permit said molten material to flow therethrough.

29 Claims, 3 Drawing Figures

METHOD AND APPARATUS FOR FORMING GLASS FIBERS

TECHNICAL FIELD

The invention disclosed herein relates to a glass fiber forming feeder having at least one laminated wall comprised of a refractory metal substrate having an oxygen impervious, precious metal sheath intimately bonded thereto by means of hot isostatically pressing the precious metal sheath to the refractory metal substrate.

BACKGROUND ART

There has been a long-felt need to produce a long lasting feeder for flowing streams of molten inorganic material, such as glass, at operating temperatures higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and for longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious, precious metal sheath intimately bonded thereto by hot isostatic pressing, said wall having at least one orifice extending therethrough adapted to pass said molten material therethrough.

BEST MODE OF CARRYING OUT THE INVENTION

Figure 1:
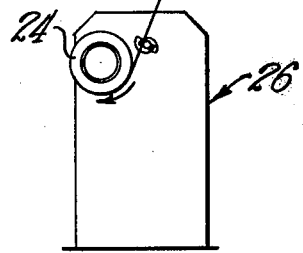
FIG. 1 is a semi-schematic front elevational view of a glass textile type fiber forming system.

As shown in FIG. 1, feeder 10, which is comprised of containment or sidewalls 12 and a bottom, working or stream defining wall 14, is adapted to provide a plurality of streams of molten inorganic material, such as glass. The streams of molten glass can be attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

Figure 2:
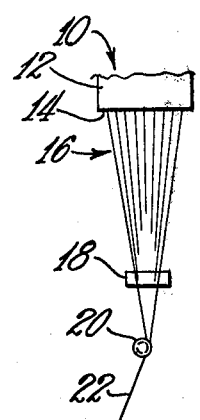
FIG. 2 is a semi-schematic front elevational view of a glass wool or rotary fiber forming system.
Figure 2:
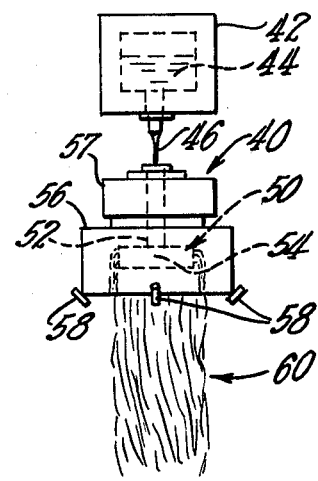

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds is comprised of a quill 52 and a circumferential stream defining or working wall 54 having a plurality of apertures 71, orifices 77, or passageways 88 therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58 as is known in the art.

As is shown in the drawings, the fiberization or working walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in concurrently filed patent application Ser. No. 200,677, filed on Oct. 27, 1980, in the name of Mohinder S. Bhatti, which is hereby incorporated by reference.

Particularly, such refractory metals are selected from the group of materials consisting of molybdenum (Mo), columbium (Cb), tungsten (W), rhenium (Re) tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals are selected from a group consisting of platinum (Pt), paladium (Pd), iridium (Ir), osmium (Os), rhodium (Rh), ruthenium (Ru), and alloys based on such metals. Included in the platinum alloys are H alloy and J alloy which are alloys of platinum and rhodium of about 90%/10% and 75%/25% composition, respectively.

As disclosed in the aforementioned concurrently filed patent application, care should be taken in the preparation of the surfaces of the substrate and precious metal layers to insure a good bond between the core and sheath.

Simply stated, the sheath is formed to closely conform to the exterior of the core, with the surfaces thereof being appropriately cleaned to promote a good metallurgical bond therebetween. The core is inserted or enclosed within the sheath to form a prelaminate unit having at least one edge or portion thereof open to the atmosphere to facilitate "out gasing". Then the prelaminate unit is heated in a vacuum to "out gas" the unit. Subsequent to the out gasing, the open edge or seams of the unit are welded or sealed in a vacuum, whereupon the unit is ready to be hot isostatically pressed to form laminate 69.

Figure 3:
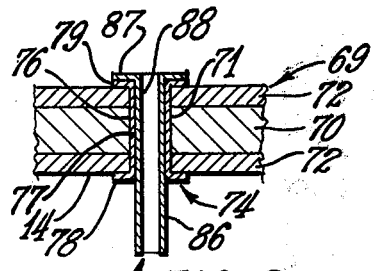
FIG. 3 is an enlarged cross sectional view of the orificed walls of the stream feeders shown in FIGS. 1 and 2.

As shown in FIG. 3, laminate 69 is formed by hot isostatically pressing core or substrate 70 to sheath 72 to form laminate 69. At this point, sheath 72 should completely surround the exterior of core 70.

A plurality of apertures 71 extending through laminate 69 are formed by any suitable means, such as by drilling. Preferably, apertures 71 are formed in the core 70 and sheath 72 subsequent to the HIP'ing operation or procedure to form laminate 69.

Aperture 71, as such, exposes a portion of refractory metal core 70 which may become exposed to an oxidizing atmosphere during operation. However, the laminate with aperture 71 therethrough still may function if molten glass is continuously maintained in the orifice over the refractory metal core to preclude the oxygen containing atmosphere from contacting the core.

However, in plant operation this is not always practical. Therefore, orifice 71 of laminate 69 should be provided with a precious metal coating or liner 74 sealed or bonded to the sheathing 72 and/or core 70 to prevent the oxidization of the core material.

Insert or element 74 is, preferably, of the same type of precious metal material as the sheath 72. However, different but compatible materials can be employed.

Basically, element 74 is inserted in laminate 69 whereupon first flange or head 78 and second flange or head 79 are formed therein to abut the exterior surfaces of sheath 72. That is, a portion of sheath 72 is positioned intermediate the core 70 and each flange 78 and 79.

Insert 74 may be a solid plug or preferably, may be a hollow eyelet or element having an orifice 77 extending therethrough. Orifice 77 is defined by sleeve 76 which is intermediate and contiguous with flanges 78 and 79.

Preferably, element 74 is provided as a hollow, precious metal eyelet having one flange such as flange 78 preformed therein. Eyelet 74 is then inserted into aperture 71, and the other flange is formed therein such that flanges 78 and 79 are in firm abutting engagement with the sheath 72.

At this point element 74 may be welded or sealed to laminate 69. In one method, flanges 78 and 79 may be electron beam or laser welded to the portion of sheath 72 associated therewith to seal core 70 from the environment or atmosphere surrounding bottom wall 14.

Preferably element 74 is hot isostatically pressed or gas pressure welded to laminate 69 such that sleeve 76 is intimately bonded to sheath 72 and core 70, and such that flanges 78 and 79 are intimately bonded to sheath 72. Thus, good electrical and thermal conductivity are established through the junction of element 74 and laminate 69.

Consistent with the HIP welding technique set forth in the Metals and Ceramics Information Center Report No. MCIC-77-34 published by the Battelle Columbus Laboratories in November, 1977, the hollow elements 74 may be HIP welded to laminate 69.

With the elements 74 inserted in the laminate 69 as shown in FIG. 3, the laminate 69 is placed inside a sheet metal container having a pressure transmitting media tightly packed between the container and the laminate 69 and in the orifice 77 of each element 74. That is, the pressure transmitting media is tightly packed in all the space within the container not occupied by the laminate 69 and elements 74.

The pressure transducing or transmitting media can be of the type known in the art such as powdered metal, beaded or granulated glass such as "Vycor," or amorphous silica. Preferably, orifices 77 are press fit with a solid or fully densified rod of the pressure transducing media, metal or silica, which fluidizes or softens upon the application of heat and pressure during the HIP'ing process as should the rest of the transmitting medium, to insure a full application of pressure to the walls of sleeve 76 to intimately bond the exterior of sleeve 76 to core 70 and/or sheath 72 at orifice 77.

Preferably, the pressure transducing media should not become so fluid so as to "wick" between the surfaces to be bonded together.

Subsequently, the pressure transducing media is removed by any suitable means, such as leaching.

It is to be noted, however, that the element 74 and/or members 84 may be HIP welded to laminate 69 and/or each other in the argon fluid of a conventional HIP'ing system if the flanges 78, 79 and 87 are previously hermetically sealed or welded (e.g. EB welded) to laminate 69. That is, the sheet metal box and special pressure transducing media may be dispensed with.

Thus, with HIP welding, flanges 78 or 79 are metallurgically bonded to sheath 72 and sleeve 76 is metallurgically bonded to laminate 69 to provide a laminated fiberization wall 14.

Orifices 77 can be sized to provide the proper passageway adapted to permit molten glass or inorganic material to flow therethrough as either a stationary or rotatable fiber forming system, that is, for textile or wool operation.

In some instances it may be desirable to attach a precious metal, tubular member 84 to laminate 69 and/or one of flanges 78 or 79 or the inner wall of orifice 77. Preferably, member 84 is of the same material as element 79 and sheath 72.

As shown in FIG. 3, tubular member 84 is comprised of a hollow, precious metal shaft 86 having a flange 87 at one end thereof. Passageway 88 extends through shaft 86 and flange 87 and is adapted to permit molten glass and/or inorganic material to flow therethrough.

When referring to attaching member 84 to laminate 69, in addition to attaching tubular member 84 directly to sheath 72, it is also meant that any portion of member 84 may be attached to element 74 that has been joined to laminate 69.

In one method flange 87 of member 84 can be electron beam or laser welded to flange 79 to permanently attach tubular member 84 to laminate 69.

Preferably, tubular member 84 is HIP welded to element 74 and/or laminate 69 consistent with the method set forth above to provide good electrical and thermal contact from member 84 to laminate 69. That is, passageway 88 should be, preferably filled with a solid rod of a suitable pressure transmitting media; of course, orifice is only occupied by member 84.

Instead of two separate HIP'ing operations to bond first element 74 to laminate 69 and a second HIP'ing operation to bond member 84 to element 74 and thus laminate 69, a hollow element 74 may be inserted and flanged or swagged into abutting engagement and then tubular member 84 inserted therein whereupon hollow element 74 and tubular member 84 are bonded together and to laminate 69 substantially simultaneously by means of a single HIP'ing operation.

Working wall 14 can be combined with sidewalls 12 to form a textile type feeder 10 having a tipless bottom wall. Or, a hollow tubular member or tip 84 can be attached to the laminate 69 to form a "tipped" working wall 14 as shown in FIG. 3. Preferably, the hollow tubular member 84 is also formed of one of the aforementioned precious metals or base alloys thereof, such as platinum.

Since refractory metals are highly creep resistant, or even substantially "creep" free, even at elevated temperatures, fiber forming feeders produced according to the principles of this invention have good "sag" resistance. That is, the fiberization walls should not deform or bow as much as an all precious metal feeder. In some instances "sag" can be substantially eliminated over the life of the feeder. Thus, finshield alignments and the like with respect to the fiberization wall and/or tips can remain essentially fixed over the life of the feeder.

Laminate 69 can be fabricated as a substantially flat wall to provide a fiberization wall 14, generally, for a textile type feeder, or laminate 69 can be fabricated into a cylindrical fiberization wall 54 having orifices 77 and/or passageway 88 extending radially outward from the axis of rotation thereof, generally, for wool operations. In either case, orifices 77 or passageways 88 should be properly sized to permit the molten glass or inorganic material to flow therethrough in either a stationary or rotatable fiber forming system.

For a rotary fiber forming system 40, the circumferential fiberization wall 54 may be formed substantially identical to the system shown in FIG. 3 except that a circumferential wall 54 would be formed as a hoop instead of a substantially flat bottom wall 14.

As such working wall 54 may be adapted to flow the molten glass directly through orifices 71, that is, without tubular member 84 inserted in orifices 71. Or tubular members 84 may be incorporated as set forth above.

Other systems for providing a precious metal insert to protect the refractory metal core exposed by the orifices extending therethrough as set forth in the concurrently filed U.S. patent applications: Ser. No. 200,650, filed on Oct. 27, 1980 in the name of Mohinder S. Bhatti and Alfred Marzocchi; Ser. No. 200,647, filed on Oct. 27, 1980 in the name of Mohinder S. Bhatti and Ser. No. 200,651, filed on Oct. 27, 1980 in the name of Mohinder S. Bhatti; all of which are hereby incorporated by reference.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation of continuous and/or staple glass filaments.

We claim:

1. A laminated wall for a feeder for supplying streams of glass to be attenuated into filaments comprising:
   a refractory metal core having an oxygen impervious, precious metal sheath intimately bonded thereto by hot isostatic pressing to form a laminate, said laminate having at least one aperture extending therethrough adapted to permit said molten glass to flow therethrough; and
   an element positioned in said aperture to prevent the oxidation of said core at elevated temperatures.

2. The feeder wall of claim 2 wherein said element is made from precious metal.

3. The feeder wall of claim 2 wherein said element has a flange at each end thereof sealed to said sheath, said element having an orifice extending therethrough.

4. The feeder wall of claim 3 wherein said flanges are sealed to the exterior of said sheath.

5. The feeder wall of claim 4 further comprising a tubular member joined at the orifice to define the streams of glass.

6. The feeder wall of claims 1, 2 or 3 wherein the core is a material selected from the group consisting of Ti, V, Cb, Ta, Cr, Mo, W, Re and base alloys thereof and wherein said sheath is a material of the group consisting of Pt, Pd, Ir, Os, Rh, Ru and base alloys thereof.

7. The feeder wall of claim 1 wherein said refractory metal is an alloy of Mo, Ti, and Zr.

8. The feeder wall of claim 7 wherein said sheath is an alloy of Pt and Rh.

9. The feeder wall of claim 5 wherein said tubular member is positioned at least partially within said orifice, said member having a passageway extending therethrough.

10. The feeder wall of claim 1 wherein said element is made from precious metal, said element having at least one orifice therethrough adapted to permit said molten glass to flow therethrough, said element being sealed to the precious metal sheath to prevent the oxidation of the core at temperatures above about 1000° C.

11. The feeder wall of claim 10 further comprising a hollow tubular member attached to said laminate at said orifice to define said streams of material.

12. The method of making a laminated wall for an inorganic fiber forming feeder comprising:
    supplying a refractory metal core;
    establishing a first layer made from a precious metal having a shape generally conforming to the shape of the core;
    hot isostatically pressing said core and first layer to intimately bond the layer to the core to form a laminate; and
    providing at least one aperture through said laminate having an element positioned therein adapted to permit the flow of molten inorganic material therethrough to form said feeder wall.

13. The method of claim 10 wherein said aperture is formed in said laminate subsequent to the hot isostatically pressing the core and first layer together.

14. The method of making a laminated wall for an inorganic fiber forming feeder comprising:
    supplying a refractory metal core;
    establishing a sheath made from a precious metal having a shape generally conforming to the shape of the core around said core;
    hot isostatically pressing said core and sheath to intimately bond the sheath to the core to form a laminate;
    providing at least one aperture through said laminate;
    inserting an element in said aperture;
    providing a flange at each end of the element adjacent said sheath;
    providing an orifice through said element adapted to permit molten inorganic material to flow therethrough; and
    sealing said flanges to said sheath.

15. The method of claim 14 wherein said orifice is established in said element prior to insertion of the element into said laminate.

16. The method of claims 12 or 14 further comprising joining a hollow tubular member to said laminate adapted to define the flow of said molten inorganic material therethrough.

17. The method of claim 14 wherein the flanges are sealed to the sheath by electron beam or laser welding.

18. The method of claim 17 further comprising after welding said flanges to said sheath, hot isostatically pressing the laminate a second time to heal structural defects in the wall.

19. The method of claim 14 further comprising positioning a tubular member in said orifice and sealing said member to said laminate.

20. The method of claim 19 wherein said tubular member has a flange, said flange being sealed to one of the flanges of said element.

21. The method of claim 19 wherein said tubular member has a shaft, said shaft being sealed to said laminate.

22. The method of claim 21 wherein said shaft is intimately bonded to said laminate by hot isostatically pressing the element and laminate together.

23. The feeder wall produced according to the method of claims 12, 14 or 22.

24. The method of forming glass fibers comprising:
providing a feeder for supplying molten streams of inorganic material to be attenuated into fibers, said feeder comprising a refractory metal core having an oxygen impervious, precious metal sheath intimately bonded thereto by hot isostatic pressing to form a laminate, said laminate having at least one aperture extending therethrough adapted to issue streams of molten glass therefrom, and an element positioned in said aperture to prevent the oxidation of said core at elevated temperatures; and
attenuating the streams of molten glass into fibers.

25. The method of claim 24 wherein said member is made from precious metal and is sealed to said sheath in said orifices; said member having at least one orifice extending therethrough adapted to permit molten glass to flow therethrough.

26. The feeder wall of claim 1 wherein said sheath is bonded to at least two opposing sides of said core.

27. The feeder wall of claim 1 wherein said feeder is substantially stationary.

28. The feeder wall of claim 1 wherein said feeder is rotatable.

29. The feeder wall of claim 26 wherein said sheath is an envelope intimately bonded to all exterior surfaces of said core.

* * * * *